United States Patent [19]

Siegel

[11] Patent Number: 4,776,646
[45] Date of Patent: Oct. 11, 1988

[54] HYDRAULIC VEHICLE BRAKE SYSTEM

[75] Inventor: Heinz Siegel, Stuttgart, Fed. Rep. of Germany

[73] Assignee: Robert Bosch GmbH, Stuttgart, Fed. Rep. of Germany

[21] Appl. No.: 62,988

[22] Filed: Jun. 17, 1987

[30] Foreign Application Priority Data

Oct. 22, 1986 [DE] Fed. Rep. of Germany ....... 3635880

[51] Int. Cl.<sup>4</sup> .............................................. B60T 8/40
[52] U.S. Cl. ...................................... 303/114; 303/92
[58] Field of Search ...................... 60/545; 303/52, 92, 303/113, 114, 116, 119

[56] References Cited

U.S. PATENT DOCUMENTS 3,927,915 12/1975 Adachi .............................. 303/52 X

FOREIGN PATENT DOCUMENTS 3040562 5/1982 Fed. Rep. of Germany .

Primary Examiner—Duane A. Reger
Attorney, Agent, or Firm—Edwin E. Greigg

[57] ABSTRACT

A hydraulic vehicle brake system having a brake booster integrated in a housing and having a master cylinder unit comprising at least two master cylinder pistons with corresponding pressure chambers for at least two separate brake circuits into which an anti-skid system is incorporated, and in which the brake booster and the anti-skid system communicate with a hydraulic energy supply system. The master cylinder pistons are to be disposed in the housing in an axially parallel location, radially opposite of and axially parallel with a restoring piston to be actuated by the anti-skid system. To this end, the master cylinder pistons are connected in the housing with a bushing that is axially displaceable by elements of the brake booster, and this bushing also acts upon the restoring piston.

20 Claims, 2 Drawing Sheets

HYDRAULIC VEHICLE BRAKE SYSTEM

BACKGROUND OF THE INVENTION

The invention is based on a hydraulic vehicle brake system as defined hereinafter. Vehicle brake systems of this type, having two separate brake circuits, a brake booster, an anti-skid system and hydraulic energy supply systems supplying them are known, for example from German Offenlegungsschrift No. 30 40 562. In this system, a brake booster is provided in a housing and a tandem cylinder assembly is connected following the brake booster. Located in this tandem cylinder assembly is a restoring annular piston, which when the anti-skid system is switched on displaces the cylinder piston back against the brake pedal via elements of the brake booster. The direct cooperation between the master cylinder piston and the restoring annular piston dictates that for a dual-circuit brake system, for instance, a tandem piston assembly must always be selected, which has the disadvantage of increased structural length. In this arrangement and especially with the kind of control disclosed there, under some conditions the feedback on the pedal may also be very strong, and very disagreeable to the user.

OBJECT AND SUMMARY OF THE INVENTION

The hydraulic vehicle brake system according to the invention has the advantage over the prior art that the axially parallel location of the master cylinder pistons surrounding the restoring piston, in the same housing with the brake booster, results in a very compact structural component, which has a reduced length and in which the action of the master cylinder pistons takes place separately from the movement of the restoring piston.

The separation of the master cylinder pistons from the restoring piston, in particular, is due to the disposition of the bushing according to the invention; the axial displacement of this bushing causes the displacement of the master cylinder pistons, be separately from any action upon the restoring piston. The elements of the brake booster, such as the servo piston set into motion by a slide, effect the axial displacement of the bushing. This brake booster also communicates with the hydraulic energy supply sustem that is separate from the brake hydraulics per se.

While the bushing bottom itself acts upon the restoring piston, the bushing is intended according to the invention to have a bushing collar by way of which the motion of the bushing is transferred to the master cylinder pistons. To this end it is preferably provided that a ring, which surrounds the bushing at a predetermined distance, is disposed between the master cylinder pistons and the bushing collar. If the peripheral edge of the ring facing the inner wall of the housing is also embodied as curved, then this ring can tilt in the housing, and thus absorb various pressure strains on the individual master cylinder pistons. As a result, differing volumes in the brake circuits, for examle, or a different amount of brake wear can be compensated for. Since these factors may result in differing force moments upon the bushing, the bushing should be lined with resilient guide rings on its peripheral edges that touch the inner housing wall.

For better retention of the ring with respect to the bushing collar, the ring may have a bulge and the bushing collar may have a corresponding recess. Hinge bolts, which permit tilting of the ring, are suitable means for connecting the ring and the master cylinder pistons.

The restoring piston itself is preferably supported between the master cylinder pistons, or their cylindrical chambers and pressure chambers in the housing, and it forms a chamber of variable volume in the housing. This variable-volume chamber is intended to communicate on the one hand with the container for the hydraulic fluid of the brake system and on the other with the hydraulic energy supply system. For the switchover of the two connections, magnetic valves that respond to control signals of the anti-skid system are provided. As soon as such a control signal arrives, the magnetic valve blocks the line between the chamber and the container, while the other magnetic valve opens the line to the hydraulic energy supply system.

To attain a reduction of the pedal feedback and pressure feeding into the chamber formed by the restoring piston and the housing, a throttle check valve is incorporated between the magnetic valves and the chamber.

However, not only the chamber formed by the restoring piston and the housing, but also the pressure chambers acted upon by the master cylinder pistons, communicate with the line to the hydraulic energy supply systems, and check valves are optionally used here. As a result, not only a return of the restoring piston but a return of the master cylinder pistons as well are effected when the anti-skid system is switched on.

Preferably the chamber formed by the restoring piston and the housing communicates via the brake booster with the hydraulic energy supply system, so that no separate connection is required.

A valve is provided in the master cylinder piston for relief of the pressure chamber. This valve is received by the pressure chamber itself, while the master cylinder piston passes all the way through its cylindrical chamber. The pressure chamber and cylindrical chamber communicate via a connecting line provided in the master cylinder piston, and this connecting line is closable by a valve slide bolt that tapers conically to a point or is lined with a rubber ring.

The apparatus has the further advantage that if the hydraulic energy supply system should fail, for example, it attains a completely normal braking action mechanically, without any hindrance whatever to the motion of the master cylinder pistons being presented by the restoring piston.

The invention will be better understood and further objects and advantages thereof will become more apparent from the ensuing detailed description of a preferred embodiment taken in conjunciion with the drawings.

DESCRIPTION OF THE PREFERRED EMBODIMENT

Figures 1, 2:
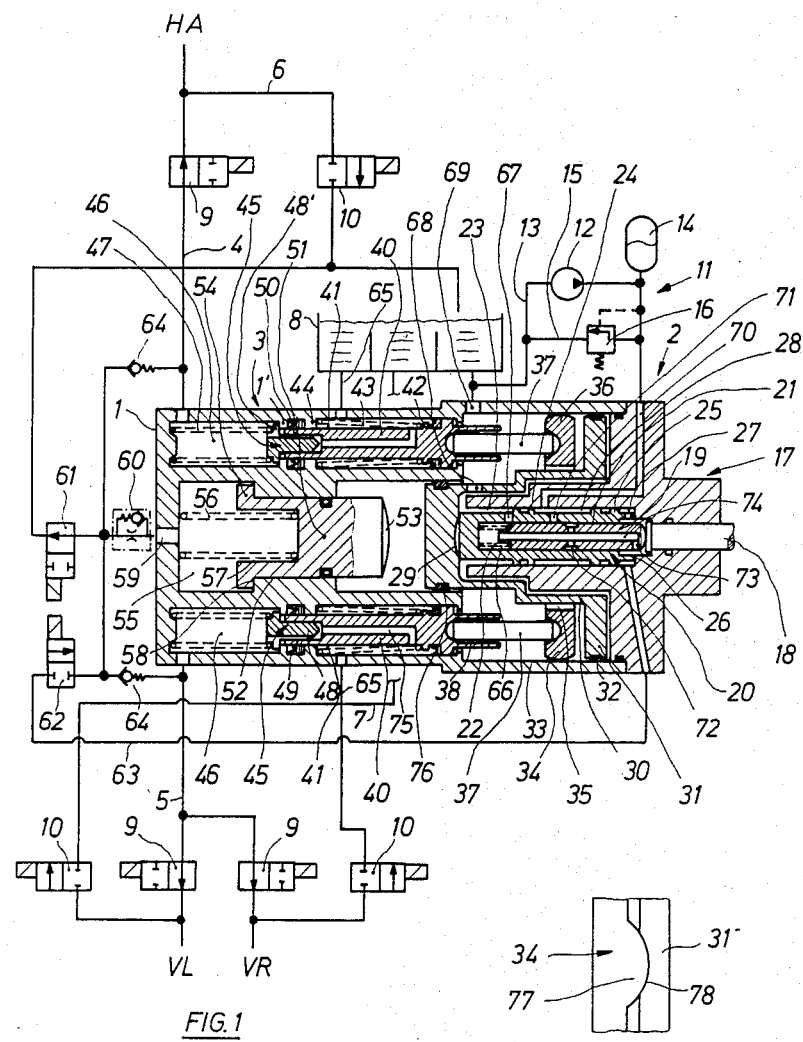
FIG. 1 is a block circuit diagram of a hydraulic vehicle brake system, having a brake booster shown in cross section on an enlarged scale and a master cylinder unit.
FIG. 2 is a detail, on a larger scale, of FIG. 1 in the coupling region between the brake booster and the master cylinder unit.

A hydraulic vehicle brake system according to the invention, as shown in FIG. 1, has a brake booster 2 accommodated in a housing 1 and a master cylinder unit 3. The master cylinder unit 3 communicates via corresponding hydraulic lines 4 and 5 with wheel brake cylinders, not shown, of front wheels VL and VR and back wheels HA. From these wheel brake cylinders, return lines 6 and 7 lead to a container 8 for the hydraulic fluid. Electromagnetically actuatable 2/2-way valves 9 and 10 are incorporated in both the hydraulic lines 4 or 5 and the return lines 6 or 7.

The brake booster 2 communicates with its own hydraulic energy supply system 11, which by means of a pump 12 can draw hydraulic fluid from the container 8 via a line 13. Also disposed in this hydraulic energy supply system 11 are a pressure reservoir 14 and, in a bypass 15 around the pump 12, a pressure limiting valve 16.

Both the master cylinder unit 3 and the brake booster 2 are inserted into the housing 1. The brake booster is substantially accommodated in an insert part 17, which closes the housing 1 in cap-like fashion. Protruding axially into the insert part 17 is a piston rod 18, which outside the insert part 17 is connected to a brake pedal, not otherwise shown. In the insert part 17, this piston rod 18 meets a control slide 19, for which a servo piston 20 forms an axial control bushing 21. On the other side of the piston rod 18, the control slide 19 is braced via a spring 22 against the bottom of the control bushing 21.

The servo piston 20 rests axially displaceably in an axial bore 23 of the insert part 17, where it is guided via ring-like sleeves 24 and 25. Cylindrical chambers 27 and 28 are formed between the ring-like sleeves 24 and 25, and between the ring-like sleeve 25 and a stop shoulder 26 of the insert part 17.

With its end face 29, the servo piston 20 meets a cup-shaped bushing 30, which is braced against the inner wall 33 of the housing with both a bushing collar 31 and a guide ring 32.

A ring 34 surrounds the bushing 30, keeping a distance 35 between them, and the ring 34 has a curved annular edge 36. As a result, the ring 34 can assume a tilted position to a certain extent, as described hereinafter. The ring 34 also backs the bushing collar 31.

On the other side, remote from the bushing collar 31, hinge bolts 37 are inserted in to the ring 34, and on the other end these bolts engage the inside of a sheath-like extension 38 of a master cylinder piston 40.

Each master cylinder piston 40 passes through a cylindrical chamber 41 and is braced against the cylindrical chamber bottom 44 by means of a spring 43 that meets an annular shoulder 42 of the master cylinder piston 40. Each master cylinder piston also passes through this cylindrical chamber bottom 44, however, and with a valve 45 engages the inside of a pressure chamber 46. The valve 45 is braced on one end against the bottom of the housing 1 via a spring 47, and on the other end it is seated with a conically pointed slide bolt 48 in a bore 49 in the master cylinder piston 40. This slide bolt 48 has at least one axial longitudinal groove 50 toward its circumference, communicating with the pressure chamber 46. It also has an annular flange 48′, with which it meets a housing shoulder 1′ in order to open the valve. As a result, a simple central valve is created.

Figure 3:
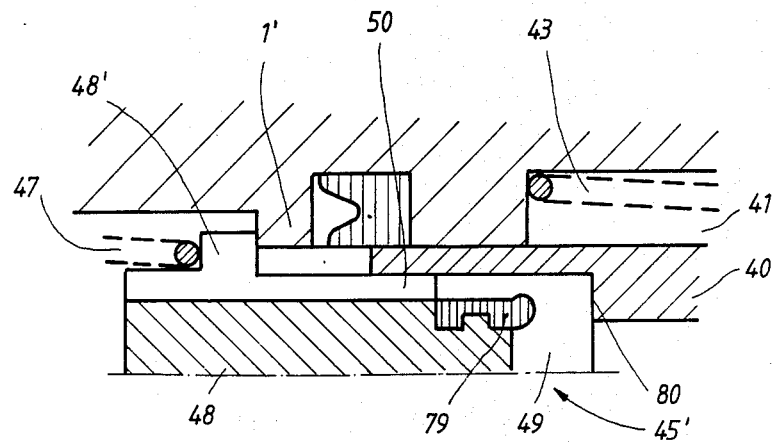
FIG. 3 is an enlarged detail of FIG. 1 in the vicinity of a valve engaging one master cylinder.

In another embodiment of the valve 45′ shown in FIG. 3, an elastic ring 79, instead of the conical element, is slipped onto the slide bolt 48, and upon closure of the valve this ring seals it off from a piston shoulder 80.

In the present exemplary embodiment of FIG. 1, two axially parallel mutually opposed master cylinder pistons are provided, between which a restoring piston 51 is displaceably supported This restoring piston 51 slides in an axial guide bore 52 and with its end face 53 it meets the bushing 30. Opposite the end face 53, it has an annular flange 54, with which it is displaceably supported in a chamber 55. The motion of the restoring piston 51 is effected counter to the pressure of a spring 56, which rests in a blind bore 47 of the restoring piston 51 and is braced against the bottom of the chamber 55. The annular flange 54 has an abutment in an annular shoulder 58 of the chamber 55.

The chamber 55 communicates via an opening 59, a throttle check valve 60 and a magnetic valve 61 with the container 8. Via a further, parallel-connected magnetic valve 62, the chamber 55 communicates via the line 63 with the cylindrical chamber 27 as well, and via a respective check valve 64 with the hydraulic lines 4 and 5.

Also communicating with the container 8 are the cylindrical chambers 41, via the connections 65. Similarly, between the spring chamber 66 for the spring 22 bracing the control slide 19 and the container 8, a return connection exists via the openings 67, 68 and 69. Contrarily, a pressure connection is established between the container 8 and the cylindrical chambers 27 and 28, via the hydraulic energy supply system 11, a connection line 70, a bore 71 in the servo piston 20, radial bores 72 and 73 and an axial bore 74 connecting them.

The mode of operation of the present vehicle brake system is as follows:

The pressure of the brake pedal is transferred to the piston rod 18. This element, in turn, acts upon the control slide 19, which moves axially to the left, counter to the force of the compression spring 22. In so doing, it closes the opening 67 and thus closes the return connection with the container 8. The radial bores 72, contrarily, open the connection with the hydraulic energy supply system 11 via the bore 71 and the connection line 70. As a result, pressure medium can reach both the cylindrical chamber 28 and, via the bore 71, the radial bores 72, the axial bore 74 and the radial bore 73, as well as the cylindrical chamber 27. This pressure medium displaces the servo piston 20 axially to the left until such time as the pressure connection is disconnected again.

With its axial motion, the servo piston 20 takes the cup-shaped bushing 30 along with it, and via its bushing collar 31, the bushing guides the ring 34. As a result, the pressure via the hinge bolt 37 upon the master cylinder pistons 40 is increased, so that via the valves 45 the connecting line 75 between the pressure chamber 46 and the cylindrical chamber 41 is closed. In the pressure chamber 46, brake pressure is thus produced, which can act upon the brake cylinders, not shown, via the magnetic valves 9.

The bushing 30 displaces the restoring piston 51 as well, however, so that hydraulic fluid can drain out of the chamber 55 through the opening 59 and the throttle check valve 60, via the magnetic valve 61, into the container 8.

If an anti-skid regulation (ABS) is initiated, then the magnetic valve 61 closes, while the magnetic valve 62 opens. Pressure medium can thus flow out of the cylindrical chamber 27 via the line 63 into the chamber 55 and also via the check valves 64 into the pressure chambers 46. Dictated by the throttle check valve 60, the restoring piston 51 slowly displaces the bushing 30 and with it the servo piston 20 against he piston rod 18 or the foot pedal, until the servo piston 20 rests on the stop shoulder 26. The master cylinder pistons 40 are also restored, in the same manner. The piston travel of the master cylinder pistons 40 is limited such that in the event the servo regulation fails, enough actuation travel for safe braking is still available. The motion of the master cylinder pistons 40 for braking otherwise takes place unthrottled. Via the magnetic valves 9, the pressure to the brake cylinders can be regulated (pressure buildup and maintenance of constant pressure). The pressure is decreased via the magnetic valves 10.

The ring 34 substantially serves, during force transfer, to compensate for possibly different volumes in the two brake circuits, for example in the event of uneven brake wear. For this reason, it is tiltable because of the distance 35 and the curved annular edge 36. If one brake circuit should fail completely, only one master cylinder piston 40 or hinge bolt 37 acts upon the ring 34. As a result, the ring 34 is tilted, until it rests on the bushing collar 31 and a force-locking condition is again established. By means of this unilaterally exerted force, a moment upon the bushing 30 is produced, which is absorbed by the guide rings 32 and 76. These guide rings 32 and 76 are therefore preferably made of plastic.

For the sake of better support between the bushing collar 31 and the ring 34, it is provided as shown in FIG. 2 that the ring 34 have bulges 77, which when they meet the bushing collar 31 are received by indentations 78.

If there is a complete failure of the hydraulic energy supply system 11 or of the rest of the electronics, the force transfer can also be done purely mechanically, in the present vehicle brake system. This is done via the piston rod 18, the control slide 19, the servo piston 20, the bushing 30, the ring 34, the hinge bolt 37 and the master cylinder pistons 40. The restoration is then done by means of the springs 47, 43, 56 and 22 provided. For this reason as well, the diameter of the restoring piston 51 should be larger than the diameter of the servo piston 20.

The foregoing relates to a preferred exemplary embodiment of the invention, it being understood that other variants and embodiments thereof are possible within the spirit and scope of the invention, the latter being defined by the appended claims.

What is claimed and desired to be secured by Letters Patent of the United States is:

1. A hydraulic anti-skid and brake system for a vehicle having a brake booster integrated with a housing having an inner wall and a master cylinder unit, said master cylinder unit comprising at least two master cylinder pistons with correponding pressure chambers for supplying fluid pressure to at least two separate brake circuit lines, said brake booster and said anti-skid system being arranged to communicate with a hydraulic energy supply system, further wherein said master cylinder pistons are disposed in said housing in axially parallel locations radially opposite of and axially parallel with a restoring piston actuated by the anti-skid system.

2. A brake system as defined by claim 1, in which said master cylinder pistons (40) are associated in said housing (1) with a bushing (30) which is axially displaceable by elements (20, 19, 18) of said brake booster (2), which bushing also acts upon said restoring piston (51).

3. A brake system as defined by claim 2, in which said bushing (30) is provided toward said inner wall (33) of said housing with a bushing collar (31), which overlies a ring (34) and which is adapted to surround said bushing (30) in spaced relation thereto.

4. A brake system as defined by claim 3, in which said ring (34) has a curved peripheral edge (36).

5. A brake system as defined by claim 3 in which said ring (34) has a bulged area (77), which is arranged to be received in a corresponding recess (78) of said bushing collar (31).

6. A brake system as defined by claim 3, in which said master cylinder pistons (40) and said ring (34) are associated via hinge bolts (37).

7. A brake system as defined by claim 2, in which said bushing (30) is supported toward the inner wall of said housing wall (33) with plastic guide rings (32, 76).

8. A brake system as defined by claim 1, in which said restoring piston (51) together with said housing (1) forms a variable-volume chamber (55), which communicates on the one hand with a container (8) for the hydraulic fluid and on the other hand with said hydraulic energy supply system (11).

9. A brake system as defined by claim 8, in which a reversible magnetic valve (61) is disposed between said chamber (55) and said container (8).

10. A brake system as defined by claim 8, in which a reversible magnetic valve (62) is disposed between said chamber (55) and said hydraulic energy supply system (11).

11. A brake system as defined by claim 9, in which a throttle check valve (60) is disposed between said magnetic valve (61) or optionally said magnetic valve (62) and said chamber (55).

12. A brake system as defined by claims 9, in which said chamber communicates with said brake circuit lines (4, 5), via a throttle check valve (60) and check valves (64).

13. A brake system as defined by claim 8, in which said chamber (55) communicates via a line (63) and said brake booster (2) with said hydraulic energy supply system (11).

14. A brake system as defined by claims 1, in which said master cylinder piston (40) passes through a cylindrical chamber (41) as well as its cylindrical chamber bottom (44) and thereafter forms together with said housing (1), the said pressure chamber for generating said brake pressure.

15. A brake system as defined by claim 14, in which said master cylinder piston (40) is spring-supported in the said pressure chamber (46).

16. A brake system as defined by claim 14 in which a valve (45) provided in said pressure chamber (46), includes a slide means (48) that engages a bore in said master cylinder piston (40) for closing a connecting line (75) disposed between said pressure chamber (46) and said container (8)

17. A brake system as defined by claim 16, in which said slide means (48) is provided with a longitudinal groove (50).

18. A brake system as defined by claim 16, in which said slide means is formed with a means to cooperate with a valve seat which communicates with said connecting line (75).

19. A brake system as defined by claim 16, in which said slide means further includes an elastic ring (79) which cooperates with a shoulder 80 on said piston.

20. A brake system as defined by claim 16 in which said (45, 45') is provided with an annular flange (48'), which is arranged to engaged a housing shoulder (1') for opening of said valve.

* * * * *